United States Patent
Hassink et al.

(10) Patent No.: US 8,305,882 B2
(45) Date of Patent: Nov. 6, 2012

(54) METHODS, SYSTEMS, AND COMPUTER PROGRAM PRODUCTS FOR DETECTING AND/OR CORRECTING FAULTS IN A MULTIPROTOCOL LABEL SWITCHING NETWORK BY USING REDUNDANT PATHS BETWEEN NODES

(75) Inventors: Brian Hassink, Cary, NC (US); Matt Squire, Raleigh, NC (US); Tim Zimmer, Durham, NC (US)

(73) Assignee: Horizon Technology Funding Company V LLC, Farmington, CT (US)

( * ) Notice: Subject to any disclaimer, the term of this patent is extended or adjusted under 35 U.S.C. 154(b) by 3757 days.

(21) Appl. No.: 10/322,814

(22) Filed: Dec. 18, 2002

(65) Prior Publication Data

US 2003/0112749 A1 Jun. 19, 2003

Related U.S. Application Data

(60) Provisional application No. 60/342,203, filed on Dec. 18, 2001.

(51) Int. Cl.
*H04L 12/26* (2006.01)
*H04L 12/28* (2006.01)

(52) U.S. Cl. .... 370/225; 370/252; 370/392; 340/825.02

(58) Field of Classification Search .......... 370/200–408, 370/410, 465; 340/825.02; 709/251, 232
See application file for complete search history.

(56) References Cited

U.S. PATENT DOCUMENTS

| | | | |
|---|---|---|---|
| 6,973,084 B1 * | 12/2005 | Jha | 370/392 |
| 2004/0202112 A1 * | 10/2004 | McAllister et al. | 370/252 |

* cited by examiner

*Primary Examiner* — Afsar M. Qureshi
(74) *Attorney, Agent, or Firm* — Myers Bigel Sibley & Sajovec, P.A.

(57) ABSTRACT

Faults are detected and recovered from in a multiprotocol label switching (MPLS) network by communicating packets between a first node and a second node in the MPLS network using a set of prioritized label switch path (LSP) pairs. A failure to receive a relatively constant rate of packets during a predetermined time interval is detected at the first node. Packets are sent from the first node to the second node using a backup LSP pair responsive to detecting the failure. Packets are then sent from the second node to the first node using a backup LSP pair responsive to receiving packets at the second node on the backup LSP pair.

21 Claims, 7 Drawing Sheets

METHODS, SYSTEMS, AND COMPUTER PROGRAM PRODUCTS FOR DETECTING AND/OR CORRECTING FAULTS IN A MULTIPROTOCOL LABEL SWITCHING NETWORK BY USING REDUNDANT PATHS BETWEEN NODES

RELATED APPLICATIONS

This application claims the benefit of Provisional Application No. 60/342,203, filed Dec. 18, 2001, the disclosure of which is hereby incorporated herein by reference.

BACKGROUND OF THE INVENTION

The present invention relates to communication networks, and, more particularly, to fault detection in multiprotocol label switching (MPLS) networks.

MPLS is a core technology for deploying connection-oriented services over a non-heterogeneous network. In an MPLS network, incoming packets are assigned a label by a label edge router (LER). Packets are forwarded along a label switch path (LSP) by label switch routers (LSRs), which make forwarding decisions based on the labels assigned to the packets. An LSP is a unidirectional connection between two MPLS edge devices and may be used by network operators, for example, to guarantee a certain performance level or quality of service, to create routes around network congestion, and/or to create tunnels for virtual private networks (VPNs).

An LSP may be bound to a particular set of nodes and links using explicit routing. As in any network, various components of an MPLS network, e.g., nodes, links, etc., are subject to failure. When a component in an explicitly routed LSP fails, traffic is no longer passed along the LSP to its destination. Failure detection and correction techniques are therefore applied to LSPs inasmuch as LSPs are typically not fault tolerant and/or self-correcting. In general, there are two types of fault detection and/or correction methodologies that may be used to maintain the reliability of LSPs: 1) path protection and 2) segment protection. Path protection is based on an ingress node monitoring the status of an LSP and switching to an alternate LSP or communication path upon detecting a failure. Segment protection is based on nodes in the LSP monitoring the status of links that connect them to the MPLS network and switching to an alternate link upon detecting a link failure. In general, most of the LSP path is maintained and only a short detour around the failure is typically required. The endpoints of the LSP typically need not be notified of the detected link failure.

Referring now to FIGS. 1A-1C, a conventional fault detection technique for providing path protection in an MPLS network will now be described. At block 100, an ingress node periodically transmits an LSP echo request packet to an egress node using an LSP. Upon receiving the LSP echo request packets, the egress node transmits an LSP echo response packet back to the ingress node at block 105 of FIG. 1B. Note that an LSP is a unidirectional connection. Therefore, the egress node may use an LSP or a non-LSP path to communicate the LSP echo response packet to the ingress node. The ingress node receives any LSP echo response packets from the egress node at block 110 and determines at block 115 whether it has received a sufficient number of LSP echo response packets back from the egress node based on the number of LSP echo request packets it has transmitted. For example, the ingress node may determine whether the number of LSP echo request packets that it has transmitted exceeds a number of LSP echo response packets it has received back from the egress node by a threshold value. If the ingress node does not receive a sufficient number of responses to its "pings" of the egress node, then the ingress node assumes that there is a fault in the LSP to the egress node or that there is a fault in the return path from the egress node to the ingress node.

To isolate the source of the fault, the ingress node transmits an LSP echo request packet with a downstream mapping TLV to each of the transit nodes along the path to the egress node using the LSP at block 120. The downstream mapping TLV can be used to isolate an LSP failure point within the MPLS network. In response to an LSP echo request packet with a downstream mapping TLV, a transit node transmits an LSP echo response with an indication whether it is a valid downstream LSR for the LSP at block 125 of FIG. 1C. The ingress node correlates the LSP echo response packets with downstream mapping type-length-values (TLVs) it has received from the transit nodes at block 130 and isolates the LSP failure point at block 135. Failure recovery may be invoked to restore service; otherwise, the ingress node determines that the fault was in the response path from the egress node to the ingress node.

Unfortunately, the fault detection approach illustrated in FIGS. 1A-1C is dependent on end-to-end support of the draft LSP Ping protocol and is currently not applicable to LSPs created manually.

SUMMARY OF THE INVENTION

According to some embodiments of the present invention, faults are detected and recovered from in a multiprotocol label switching (MPLS) network by communicating packets between a first node and a second node in the MPLS network using a set of prioritized label switch path (LSP) pairs. A failure to receive a relatively constant rate of packets during a predetermined time interval is detected at the first node. Packets are sent from the first node to the second node using a backup LSP pair responsive to detecting the failure. Packets are then sent from the second node to the first node using a backup LSP pair responsive to receiving packets at the second node on the backup LSP pair.

In further embodiments of the present invention, the packets may comprise user packets and dummy packets to ensure a continuous stream of traffic between the first and second nodes.

In still further embodiments of the present invention, alternative LSP pairs may be monitored by communicating packets between the first node and the second node using one or more backup LSP pairs prior to detecting the failure. A backup LSP pair may be verified to be operational based on communicating packets thereon prior to detecting the failure. This ensures that a backup LSP pair is fault free before the first and second nodes begin using it to carry packet traffic between them.

In other embodiments of the present invention, faults are detected in an MPLS network by sending either ICMP or LSP echo request packets from a first node to a second node in the MPLS network. ICMP or LSP echo response packets are sent from the second node to the first node using a plurality of communication paths. Advantageously, by using multiple communication paths, the reliability of the reverse path from the second node to the first node may be improved. A failure is recognized in the LSP if the number of echo request packets for which no echo response packet was received exceeds a threshold.

In particular embodiments of the present invention, echo response packets are sent from the second node to the first node by using respective ones of the plurality of communication paths in round robin fashion.

In other embodiments of the present invention, echo response packets are sent from the second node to the first node by transmitting the echo response packets on multiple ones of the communication paths.

In still further embodiments of the present invention, the plurality of communication paths comprises a set of backup LSPs and/or at least one non-LSP.

Although described primarily above with respect to method aspects of detecting LSP faults in an MPLS network, it will be understood that the present invention may also be embodied as systems and computer program products for detecting LSP faults in an MPLS network.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figures 1A, 1B, 1C:
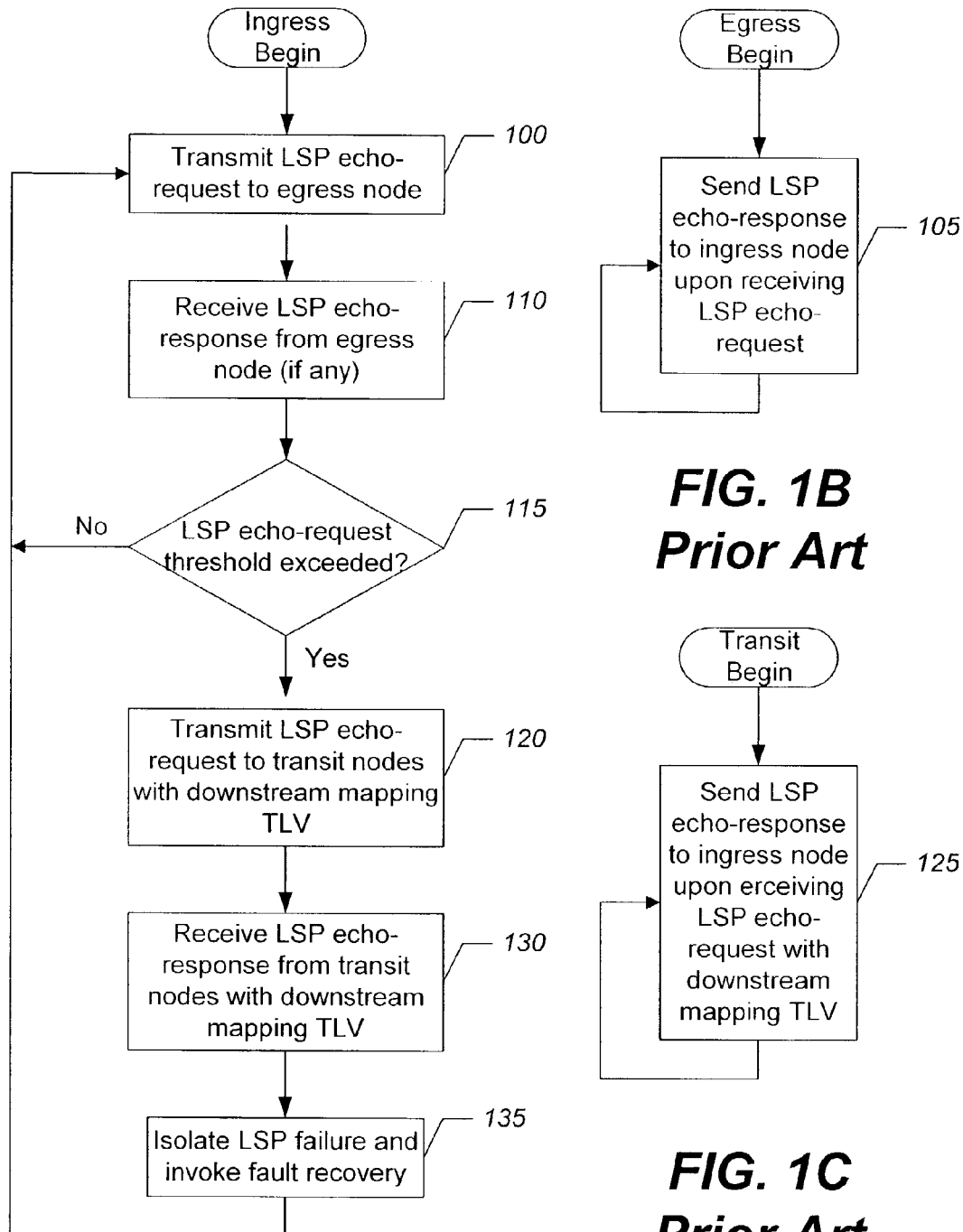
FIGS. 1A-1C are flowcharts that illustrate a conventional multiprotocol label switching (MPLS) fault detection technique.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
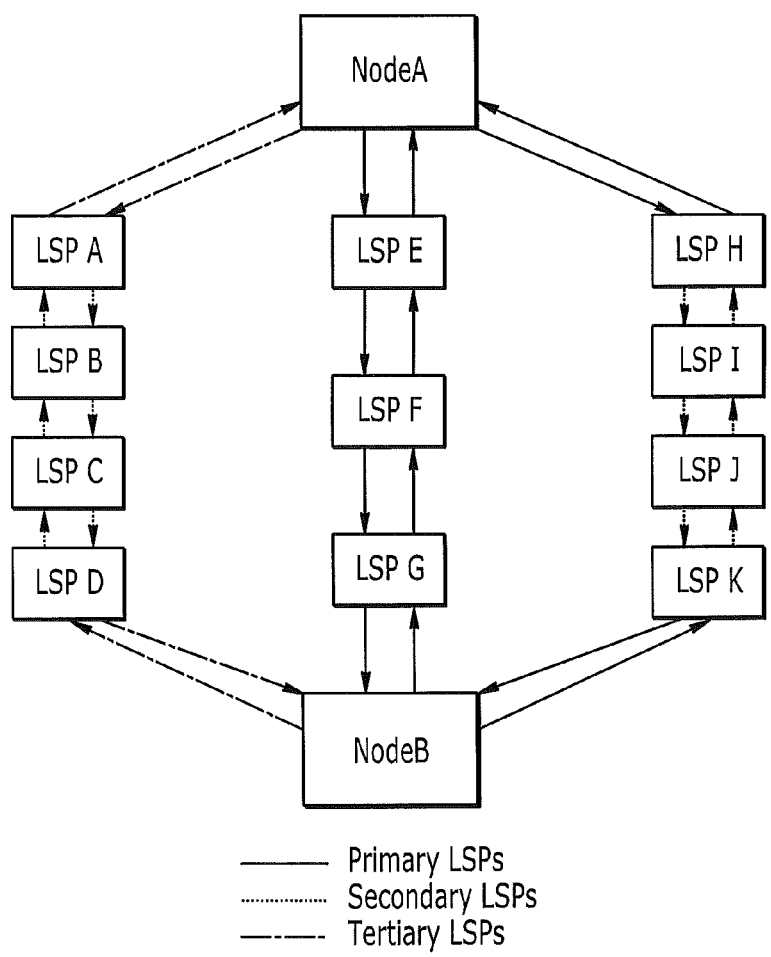
FIGS. 2 and 3 are block diagrams that illustrate MPLS network models in accordance with some embodiments of the present invention.

Embodiments of fault detection and correction methods, systems, and computer program products are described herein in the context of two different MPLS network models. The first MPLS network model is illustrated in FIG. 2 and shows two MPLS nodes, NodeA and NodeB, connected by multiple LSPs. In particular, each LSP from NodeA to NodeB is associated with an LSP from NodeB to NodeA. In this way, two unidirectional LSPs are joined to form a bi-directional path. In some embodiments, the LSPs comprising each bi-directional path may use the same links and nodes, but this is not a requirement. As shown in FIG. 2, the LSPs connecting NodeA and Node B may be prioritized as being a primary LSP, secondary LSP, and so on. The set of LSPs provide redundant or backup communication paths should a failure be detected in one or more of the LSPs. Fault detection and correction in MPLS networks of the type illustrated in FIG. 2 will be described in more detail hereinafter.

Figure 3:
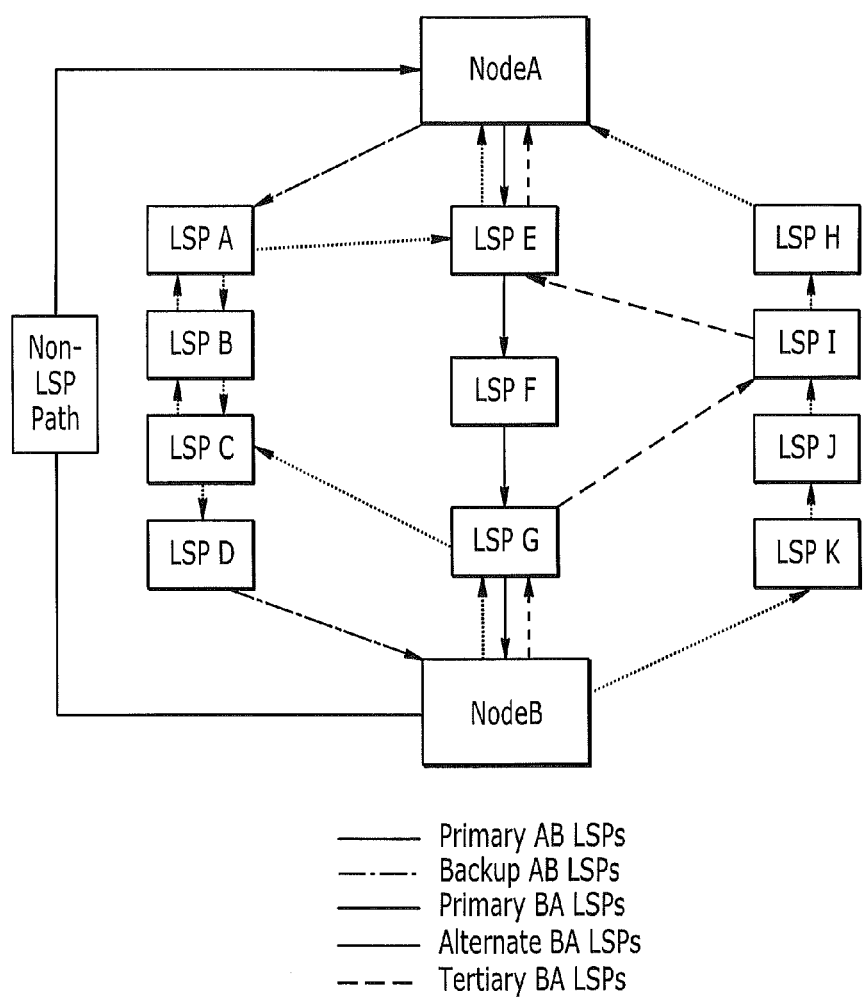

A second MPLS network model is illustrated in FIG. 3. In this model, NodeA and NodeB are again connected by multiple LSPs. In contrast to the FIG. 2 model, however, the LSPs are not associated with each other to form bi-directional paths. Instead, there are multiple independent, unidirectional LSPs connecting NodeA and NodeB. Moreover, as shown in FIG. 3, a non-LSP communication path may be established between NodeA and NodeB. Fault detection and correction in MPLS networks of the type illustrated in FIG. 3 will be described in more detail hereinafter.

Figure 4:
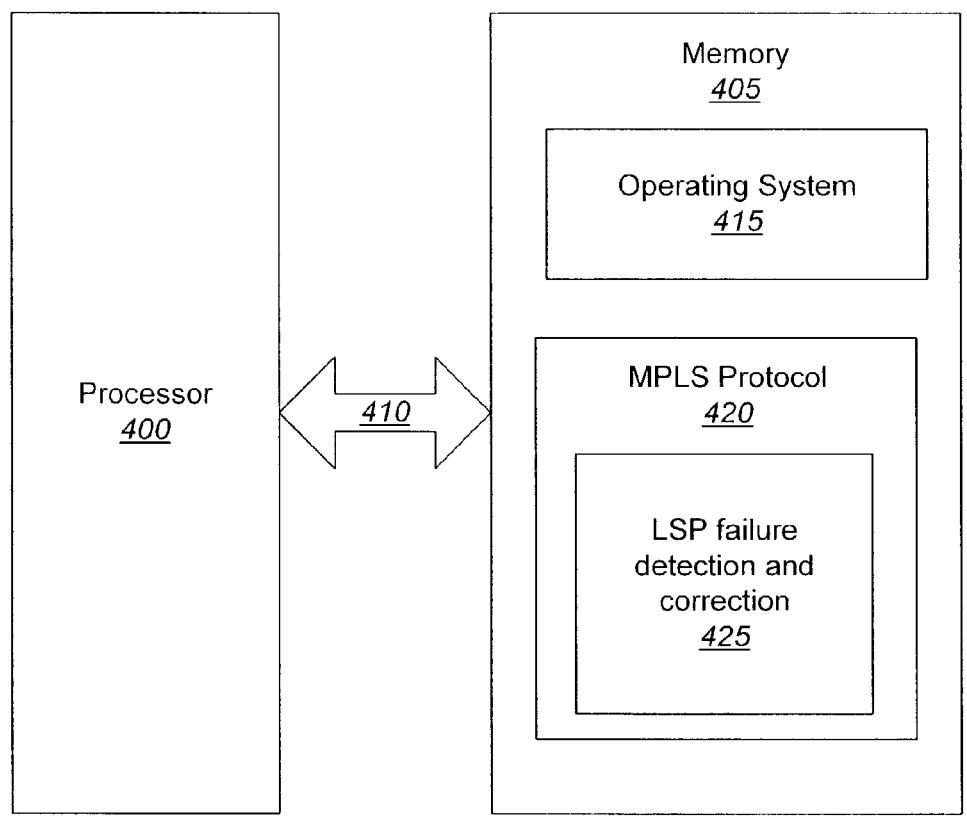
FIG. 4 is a block diagram that illustrates a software architecture for use in a MPLS network node in accordance with some embodiments of the present invention.

FIG. 4 illustrates a processor 400 and memory 405 that may be used in embodiments of MPLS network nodes, e.g., NodeA and NodeB of FIGS. 2 and 3, in accordance with the present invention. The processor 400 communicates with the memory 405 via an address/data bus 410. The processor 400 may be, for example, a commercially available or custom microprocessor. The memory 405 is representative of the one or more memory devices containing the software and data used to facilitate fault detection and/or correction in MPLS networks in accordance with embodiments of the present invention. The memory 405 may include, but is not limited to, the following types of devices: cache, ROM, PROM, EPROM, EEPROM, flash, SRAM, and DRAM.

As shown in FIG. 4, the memory 405 may contain up to two or more categories of software and/or data: an operating system 415 and a MPLS protocol module 420. The operating system 415 generally controls the operation of the MPLS node. In particular, the operating system 415 may manage the MPLS node's software and/or hardware resources and may coordinate execution of programs by the processor 400. The MPLS protocol module 420 may be configured to implement various MPLS protocols and standards and comprises an LSP failure detection and correction module 425 in accordance with some embodiments of the present invention. The LSP failure detection and correction module 425 may be configured to detect faults in MPLS network LSPs, such as the LSPs shown in the MPLS network models of FIGS. 2 and 3, and also to correct and/or invoke fault recovery mechanisms to address any detected faults.

Although FIG. 4 illustrates an exemplary MPLS node software architecture in accordance with some embodiments of the present invention, it will be understood that the present invention is not limited to such a configuration but is intended to encompass any configuration capable of carrying out operations described herein.

Computer program code for carrying out operations of an MPLS network node discussed above with respect to FIG. 4 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, systems, and computer program products in accordance with exemplary embodiments of the invention. These flowchart and/or block diagrams further illustrate exemplary operations of fault detection and/or correction in MPLS networks in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figures 5, 6:
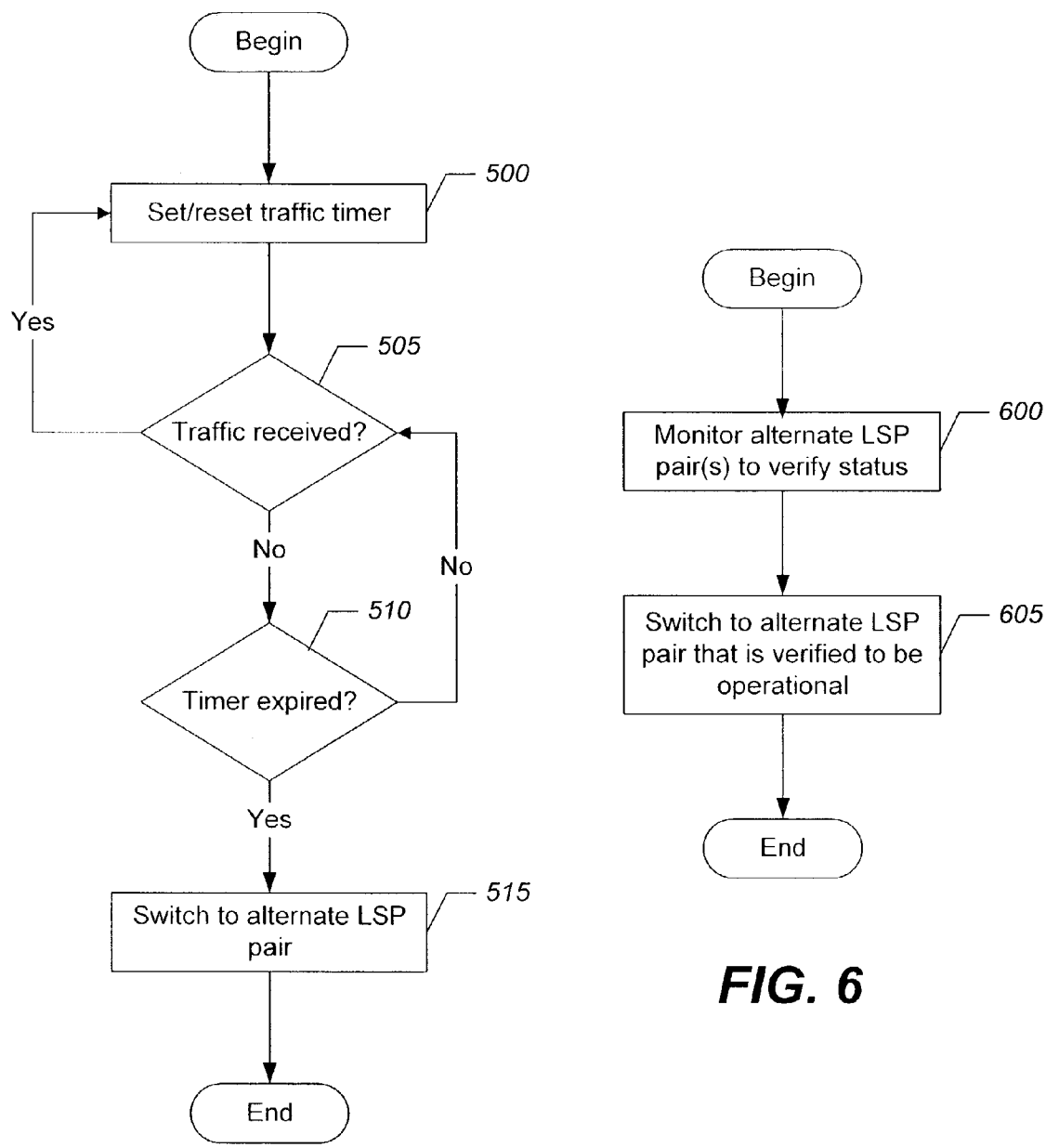
FIGS. 5-9 are flowcharts that illustrate operations for detecting and/or correcting label switched path (LSP) faults in an MPLS network in accordance with some embodiments of the present invention.

Referring now to FIG. 5, exemplary operations for detecting LSP faults in an MPLS network of the type illustrated in FIG. 2 will now be described. Recall from the discussion above with respect to FIG. 2 that MPLS networks of this type use a single "active" pair of LSPs to form a bi-directional path between NodeA and NodeB. The other LSP pairs are used to provide backup communication paths. Operations begin at block 500 where NodeA and/or NodeB of FIG. 2 sets/resets a traffic timer. The node then determines at block 505 whether MPLS packet traffic is being received from the other node. For example, a determination may be made whether a relatively constant rate of packets is received. Because an MPLS network node may not always have user traffic to transmit, a node may transmit dummy MPLS packets on the LSP to ensure that the other node associated with the LSP continues to receive packet traffic. As long as MPLS packet traffic is received at the node at a relatively constant rate, the timer is continually reset at block 500. If, however, traffic is not received, a determination is made at block 510 whether the timer has expired. If the timer has expired, then the MPLS node may switch to an alternate LSP pair, e.g., one of the secondary or tertiary LSP pairs shown in FIG. 2, and begin transmitting MPLS packet traffic on the new LSP pair at block 515. Once the other MPLS node detects traffic on the new LSP, it also switches to the new LSP pair and discontinues use of the original LSP pair.

The methodology described above with respect to FIG. 5 may be applied to the newly selected LSP pair to determine whether it is operational or whether another backup LSP pair should be chosen. In other embodiments of the present invention illustrated in FIG. 6, the MPLS network nodes may monitor the status of the alternate LSP pairs at block 600 by transmitting dummy MPLS packets thereon to determine whether they are operational using techniques described above with respect to FIG. 5. At block 605, an MPLS network node may switch to an LSP pair that has been verified to be operational when a fault is recognized in a currently active LSP at block 515 of FIG. 5. In general, it may be more desirable to proactively monitor alternate LSPs when there is more than one alternate LSP pair to select from.

The LSP fault detection and/or correction embodiments described above with respect to FIGS. 5 and 6 may be used when switchover latency is a primary consideration and data traffic is relatively continuous. A particular application where these conditions may apply is when performing a type of circuit emulation over an LSP. The bit rate of the emulated circuit may be determined and used to calculate the timeout period for the timer that is set/reset at block 500, which determines when the MPLS nodes switch to an alternate LSP pair. In general, emulated circuits have relatively fast failure detection in traditional networks and, therefore, it may be desirable to maintain that feature in an MPLS network. In some instances, the latency in sending and processing round-trip control packets may be unacceptable when compared to the performance offered by traditional networks.

Figure 7:
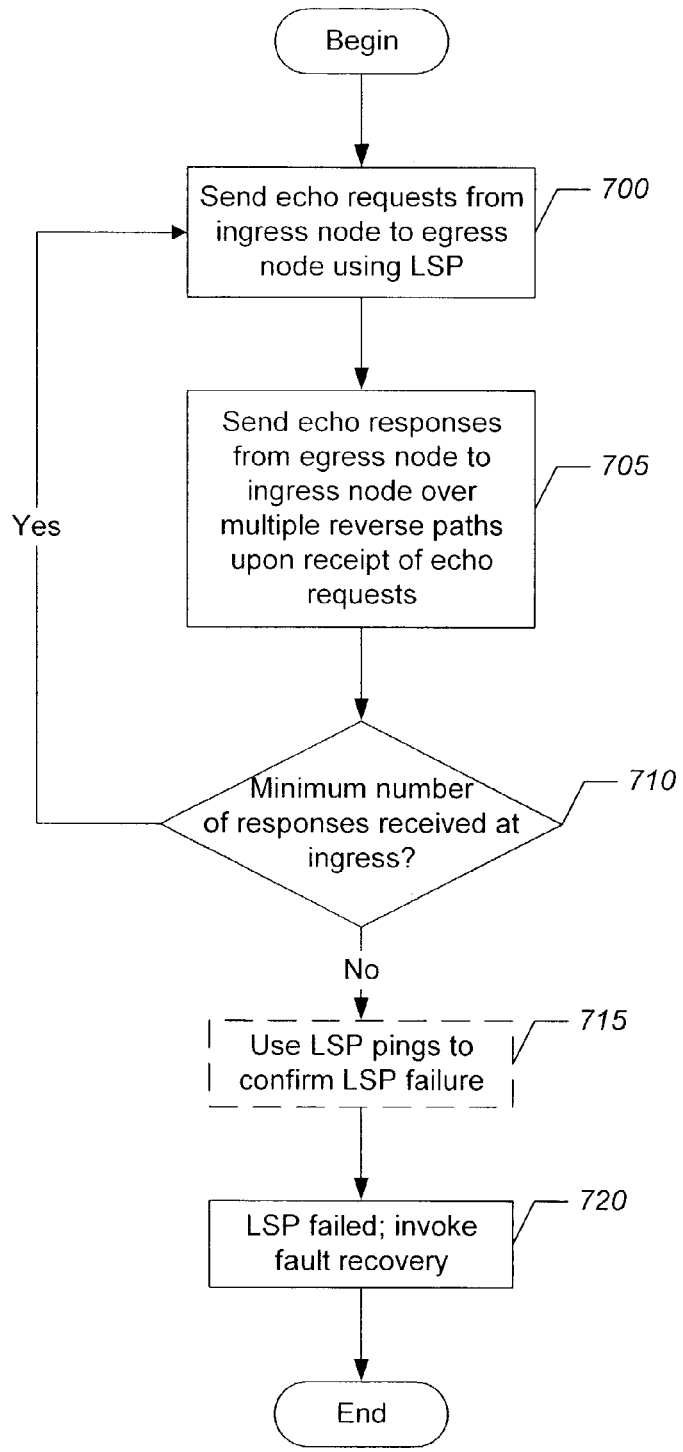

Referring now to FIG. 7, exemplary operations for detecting LSP faults in an MPLS network of the type illustrated in FIG. 3 will now be described. Recall from the discussion above with respect to FIG. 3 that MPLS networks of this type do not associate LSPs as pairs to form bi-directional paths between NodeA and NodeB. It is assumed, however, that multiple paths exist between an egress node, e.g., NodeB, and an ingress node, e.g., NodeA. As discussed above with respect to FIGS. 1A-1C, conventional fault detection methodologies use an LSP Ping protocol in conjunction with an RSVP control plane or Router Alert function to determine whether a fault exists on either a forward LSP (LSP from ingress node to egress node) or whether the fault exists on a return path (from the egress node to the ingress node). Advantageously, according to embodiments of the present invention, the multiple paths that exist between the egress node (NodeB) and the ingress node (NodeA) may be used to improve the reliability of the exchange of echo request packets and echo response packets discussed above with respect to FIGS. 1A-1C, thereby decreasing the need to resort to the LSP Ping protocol.

Operations begin at block 700 where an ingress node (NodeA) transmits echo request packets to an egress node (NodeB) using an LSP. Upon receiving the echo request packets, the egress node (NodeB) transmits echo response packets back to the ingress node at block 705 using multiple ones of the communication paths that exist between NodeB and NodeA. Because multiple reverse paths are used, there is a greater likelihood that the ingress node (NodeA) will receive the echo response packets.

Figure 8:
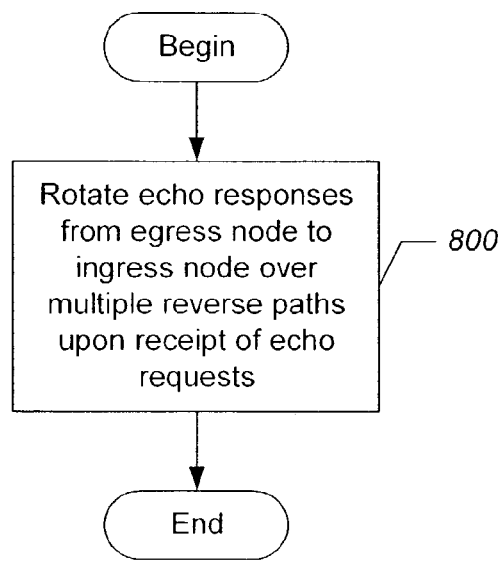
Figure 9:
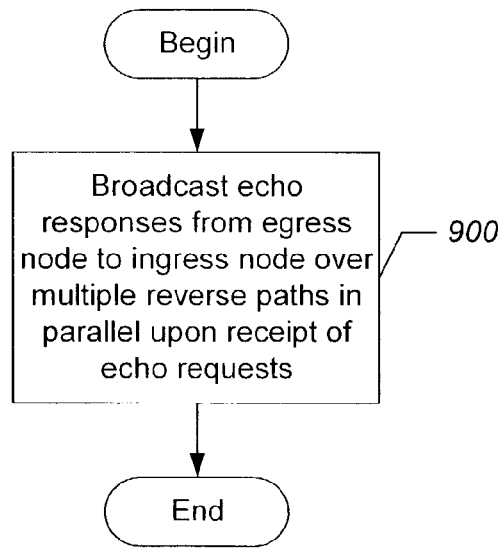

In particular embodiments of the present invention illustrated in FIG. 8, the echo response packets may be transmitted over the multiple reverse paths in round robin fashion at block 800. In other embodiments of the present invention illustrated in FIG. 9, the echo response packets may be transmitted over the multiple reverse paths by transmitting each packet in parallel over multiple ones of the reverse paths at block 900.

Returning to FIG. 7, at block 710, the ingress node (NodeA) determines at block 710 whether it has received a sufficient number of echo response packets back from the egress node based on the number of echo request packets it has transmitted. The ingress node (NodeA) may determine how many echo request packets it has sent for which no echo response packet has been received, in accordance with some embodiments of the present invention. If the number of echo request packets for which no echo response packet has been received exceeds a threshold, then the ingress node (NodeA) may optionally use LSP pings at block 715 as discussed above with respect to FIGS. 1A-1C to confirm that the failure is in the LSP path from the ingress node (NodeA) to the egress node (NodeB). Because multiple paths are used in transmitting the echo response packets from the egress node (NodeB) to the ingress node (NodeA), the ingress node (NodeA) may recognize a failure in the forward LSP and invoke fault recovery at block 720 without using the LSP Ping protocol, in accordance with other embodiments of the present invention.

Advantageously, the fault detection and/or correction methodologies discussed above with respect to FIGS. 7-9 may be used to improve the reverse path reliability between an egress node and an ingress node in an MPLS network and may reduce the need to resort to the LSP Ping protocol for determining whether a fault has occurred in the forward LSP path or in a reverse path. Furthermore, the fault detection and/or correction methodologies of FIGS. 7-9 may be used to detect faults in manual LSPs.

Many variations and modifications can be made to the preferred embodiments without substantially departing from the principles of the present invention. All such variations and modifications are intended to be included herein within the scope of the present invention, as set forth in the following claims.

We claim:

1. A method of detecting a fault in a multiprotocol label switching (MPLS) network, comprising:
   communicating packets between a first node and a second node in the MPLS network using a first label switch path (LSP) pair;
   detecting a failure in the first LSP by not having received a constant rate of packets during a predetermined time interval;
   sending packets from the first node to the second node using a second LSP pair responsive to detecting the failure; and
   sending packets from the second node to the first node using the second LSP pair responsive to receiving packets at the second node on the second LSP pair;
   wherein the packets comprise user packets and dummy packets.

2. The method of claim 1, further comprising:
   communicating packets between the first node and the second node using a plurality of backup LSP pairs prior to detecting the failure; and
   verifying that at least one of the backup LSP pairs is operational based on communicating packets thereon prior to detecting the failure.

3. A system for detecting a fault in a multiprotocol label switching (MPLS) network, comprising:
   means for communicating packets between a first node and a second node in the MPLS network using a first label switch path (LSP) pair;
   means for detecting a failure in the first LSP by not having received a constant rate of packets during a predetermined time interval;
   means for sending packets from the first node to the second node using a second LSP pair responsive to detecting the failure; and
   means for sending packets from the second node to the first node using the second LSP pair responsive to receiving packets at the second node on the second LSP pair;
   wherein the packets comprise user packets and dummy packets.

4. The system of claim 3, further comprising:
   means for communicating packets between the first node and the second node using a plurality of backup LSP pairs prior to detecting the failure; and
   means for verifying that at least one of the backup LSP pairs is operational based on communicating packets thereon prior to detecting the failure.

5. A computer program product for detecting a fault in a multiprotocol label switching (MPLS) network, comprising:
   a non-transitory computer readable storage medium having computer readable program code embodied therein, the computer readable program code comprising:
   computer readable program code configured to communicate packets between a first node and a second node in the MPLS network using a first label switch path (LSP) pair;
   computer readable program code configured to detect a failure in the first LSP by not having received a constant rate of packets during a predetermined time interval;
   computer readable program code configured to send packets from the first node to the second node using a second LSP pair responsive to detecting the failure; and
   computer readable program code configured to send packets from the second node to the first node using the second LSP pair responsive to receiving packets at the second node on the second LSP pair;
   wherein the packets comprise user packets and dummy packets.

6. The computer program product of claim 5, further comprising:

computer readable program code configured to communicate packets between the first node and the second node using a plurality of backup LSP pairs prior to detecting the failure; and computer readable program code configured to verify that at least one of the backup LSP pairs is operational based on communicating packets thereon prior to detecting the failure.

7. A method of detecting a fault in a multiprotocol label switching (MPLS) network, comprising:

sending echo request packets from a first node to a second node in the MPLS network using a first label switch path (LSP);

sending echo response packets from the second node to the first node using a plurality of communication paths; and recognizing a failure in the first LSP if the number of echo request packets for which no response packet was received exceeds a threshold.

8. The method of claim 7, wherein sending echo response packets from the second node to the first node comprises:

sending the respective echo response packets from the second node to the first node using respective ones of the plurality of communication paths in round robin fashion.

9. The method of claim 7, wherein sending echo response packets from the second node to the first node comprises:

transmitting each of the echo response packets on multiple ones of the communication paths.

10. The method of claim 7, wherein the plurality of communication paths comprises a plurality of LSPs.

11. The method of claim 7, wherein the plurality of communication paths comprises at least one non-LSP.

12. A system for detecting a fault in a multiprotocol label switching (MPLS) network, comprising:

means for sending echo request packets from a first node to a second node in the MPLS network using a first label switch path (LSP);

means for sending echo response packets from the second node to the first node using a plurality of communication paths; and means for recognizing a failure in the first LSP if the number of echo request packets for which no response packet was received exceeds a threshold.

13. The system of claim 12, wherein the means for sending echo response packets from the second node to the first node comprises:

means for sending the respective echo response packets from the second node to the first node using respective ones of the plurality of communication paths in round robin fashion.

14. The system of claim 12, wherein the means for sending echo response packets from the second node to the first node comprises:

means for transmitting each of the echo response packets on multiple ones of the communication paths.

15. The system of claim 12, wherein the plurality of communication paths comprises a plurality of LSPs.

16. The system of claim 12, wherein the plurality of communication paths comprises at least one non-LSP.

17. A computer program product for detecting a fault in a multiprotocol label switching (MPLS) network, comprising:

a non-transitory computer readable storage medium having computer readable program code embodied therein, the computer readable program code comprising:

computer readable program code configured to send echo request packets from a first node to a second node in the MPLS network using a first label switch path (LSP);

computer readable program code configured to send echo response packets from the second node to the first node using a plurality of communication paths; and computer readable program code configured to recognize a failure in the first LSP if a difference between a number of echo request packets sent from the first node and a number of response packets received at the first node exceeds a threshold.

18. The computer program product of claim 17, wherein the computer readable program code configured to send echo response packets from the second node to the first node comprises:

computer readable program code configured to send the respective echo response packets from the second node to the first node using respective ones of the plurality of communication paths in round robin fashion.

19. The computer program product of claim 17, wherein the computer readable program code configured to send echo response packets from the second node to the first node comprises:

computer readable program code configured to transmit each of the echo response packets on multiple ones of the communication paths.

20. The computer program product of claim 17, wherein the plurality of communication paths comprises a plurality of LSPs.

21. The computer program product of claim 17, wherein the plurality of communication paths comprises at least one non-LSP.

* * * * *